US006859850B1

(12) United States Patent
MacCormack

(10) Patent No.: US 6,859,850 B1
(45) Date of Patent: Feb. 22, 2005

(54) CONTROLLER FOR CONTROLLING DIRECT MEMORY ACCESS

(75) Inventor: Andrew MacCormack, Bristol (GB)

(73) Assignee: STMicroelectronics Limited, Bristol (GB)

(*) Notice: Subject to any disclaimer, the term of this patent is extended or adjusted under 35 U.S.C. 154(b) by 911 days.

(21) Appl. No.: 09/240,176

(22) Filed: Jan. 29, 1999

(30) Foreign Application Priority Data

Jan. 30, 1998 (GB) .............................................. 9802097

(51) Int. Cl.[7] .............................................. G06F 13/00
(52) U.S. Cl. .......................................... 710/52; 710/22
(58) Field of Search ........................ 710/52–57, 22–32; 709/217; 365/230.05; 345/473; 375/240

(56) References Cited

U.S. PATENT DOCUMENTS

| | | | | |
|---|---|---|---|---|
| 5,347,637 A | * | 9/1994 | Halford ....................... | 710/130 |
| 5,361,372 A | | 11/1994 | Rege et al. .................. | 395/800 |
| 5,446,839 A | | 8/1995 | Dea et al. .................... | 395/163 |
| 5,602,920 A | | 2/1997 | Bestler et al. ................ | 380/49 |
| 5,640,596 A | * | 6/1997 | Takamoto et al. ............ | 710/21 |
| 5,845,153 A | * | 12/1998 | Sun et al. ..................... | 710/56 |
| 6,032,179 A | * | 2/2000 | Osborne ...................... | 709/213 |

FOREIGN PATENT DOCUMENTS

| EP | 0 735 776 A2 | 10/1996 | ............ H04N/7/50 |
|---|---|---|---|
| EP | 0 785 675 A2 | 7/1997 | ............ H04N/5/44 |

* cited by examiner

*Primary Examiner*—Christopher B. Shin
(74) *Attorney, Agent, or Firm*—Lisa K. Jorgenson; Timothy L. Boller; SEED IP Law Group PLLC

(57) ABSTRACT

A controller for controlling direct memory access. Such a controller is particularly applicable when applied to a transport interface in the receiver of a digital set-top-box for television systems. A storage means stores the base and top addresses of a circular buffer in a memory to which received data is to be forwarded and stored, and a write pointer for such buffer is also stored in the storage means. Addressing circuitry generates the address to which the receive data is to be written in dependence on the stored base and top addresses and the write pointer. Output circuitry writes the data into the circular buffer at the location identified by the generated address.

15 Claims, 7 Drawing Sheets

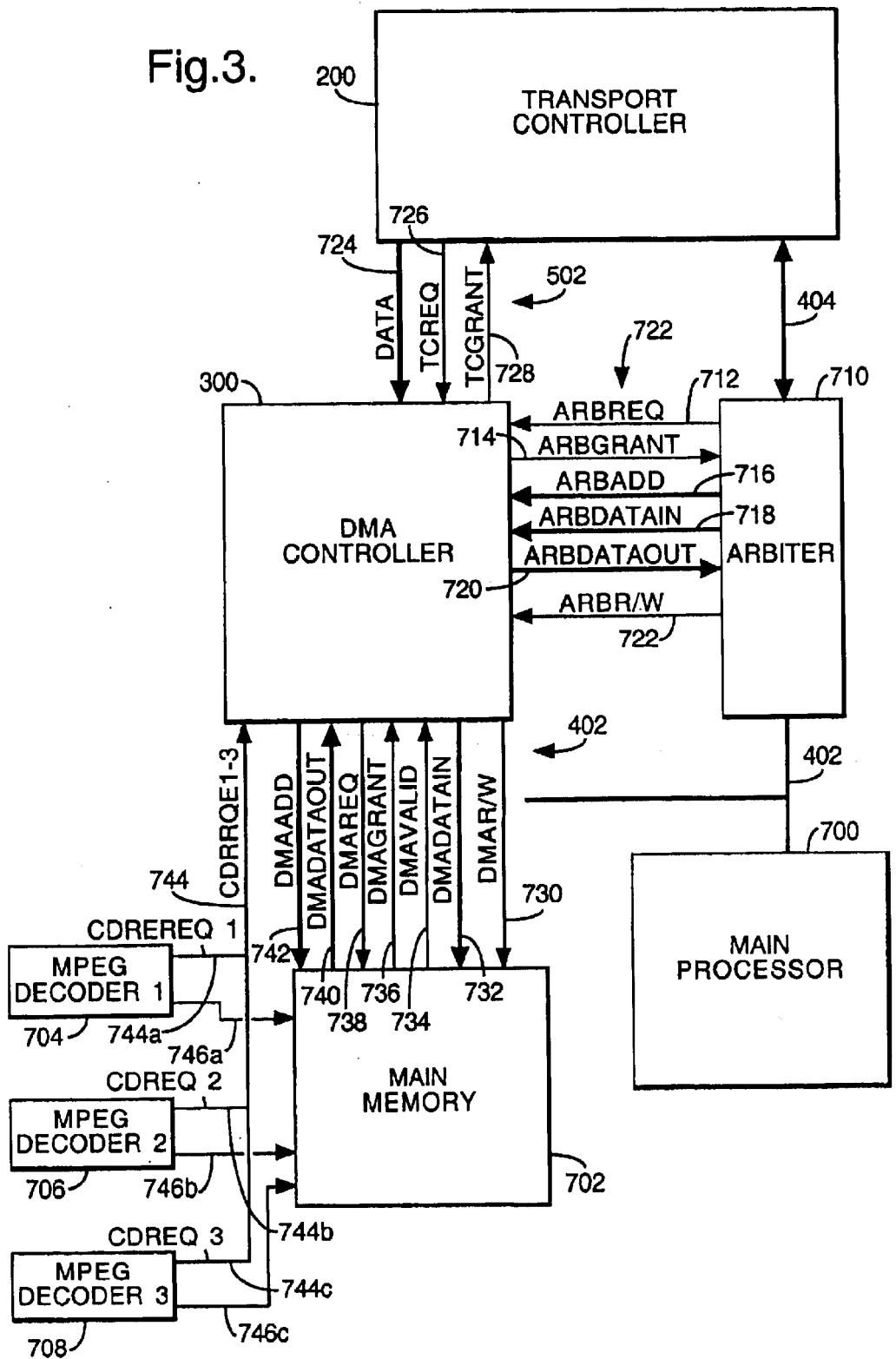

CONTROLLER FOR CONTROLLING DIRECT MEMORY ACCESS

FIELD OF THE INVENTION

The present invention relates to demultiplexing of a digital data stream in a receiver, so as to retain only those parts of the digital data stream required by the receiver. The invention relates particularly but not exclusively to such a receiver circuit in a television system having a digital set-top-box receiver.

BACKGROUND TO THE INVENTION

In digital television systems, a television is provided with a set-top-box to receive and decode a broadcast digital data stream which contains programme information for display on the television. The broadcast digital data stream may arrive at the set-top-box via a satellite or cable system, via a digital terrestrial system, or via a disk or tape. A disk or tape, such as a CD ROM drive in a personal computer, may provide digital video information for display on a monitor.

There are various known standards for digital video broadcasting (DVB) and one now commonly used standard is the MPEG (motion pictures experts group)-2 standard.

In the MPEG-2 DVB standard data is encoded into transport packets. Each transport packet is defined by the standard as consisting of 188 bytes, comprising 4 header bytes and 184 payload bytes ("the data payload"). For transmission, the transport packets are time division multiplexed into a transport stream. At the receiver in the set-top-box, the transport stream is demultiplexed to recover the transport packets. Optionally the transport packets may be scrambled and encoded with error correction information for transmission, and then descrambled and error-checked at the receiver.

The data payload in the transport packets is, according to the MPEG-2 standard, one of two types. The first type is known as a packetised elementary stream (PES), and the second type is known as program specific information (PSI).

The packetised elementary streams (PESs) form the video, audio and private data information of the broadcast. The MPEG-2 transport stream is made up of one or more PESs (either video, audio or private). The MPEG-2 transport stream is primarily intended for the transport of TV programmes over long distances. This type of stream can combine, in the same multiplex, many programmes, each of them being composed of one or more PESs. In order that the receiver can cope with this mix of programme information, the MPEG-2 standard defines four types of tables, which together make up the MPEG-2 program specific information (PSI).

Each table of the PSI is made up of one or more sections, there being a maximum of 256 sections for each table. The MPEG-2 tables are defined in the standard, and include a program allocation table, a program map table, a conditional access table and private tables. The European DVB standard additionally defines complementary service information tables. The basic service information tables are the network information table, service description table, event information table, and time and date table. The optional service information tables are the bouquet association tables, running status tables, and stuffing tables. Each section includes an optional cyclic redundancy code (CRC) check.

A PES packet always starts at the beginning of the payload part of a transport packet and is no longer than a transport packet. Sections, however, do not necessarily start at the beginning nor finish at the end of a transport packet. For a section, the transport packet can start with the end of another section.

At each decoder or set-top-box, the transport stream is decoded.

To achieve the decoding of the transport stream, each set-top-box is provided with a transport interface, which provides an interface between the transport stream input to the box and the MPEG-2 decoders which decode the audio and video information and sections broadcasts.

The transport interface demultiplexes the transport stream to retain only those transport packets which are required by the particular set-top-box for decoding. The transport stream is a set of different services time division multiplexed, and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set-top-box is only interested in receiving packets having packet identifiers of interest to the particular set-top-box, for instance those associated with a particular television programme selected for viewing. Thus once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets, but then filters the sections of the demultiplexed packets to retain only sections required by the receiver, before storing the filtered sections in the memory without any further processing.

Although the MPEG-2 DVB standard is one of the main digital video broadcast standards, there are variations within the standard. It is desirable to provide receivers having decoders which are generally as flexible possible not only to cope with variations in the standard but, if necessary, to enable the receiver to be used with a different standard.

It is therefore generally desirable to provide a single receiver which provides the flexibility of enabling different types of digital video broadcast standards to be used by utilising a programmable transport interface. Utilising such a receiver in a set-top-box may enable the set-top-box to be switched between two or more types of syntax format associated with different standards in situ.

Once the programmable transport interface has demultiplexed the transport stream to retrieve the data payload of the incoming transport packets, the data must be stored in memory to await decoding by the MPEG-2 decoders. Once stored in memory, the MPEG-2 decoders retrieve the data from the stored locations and process it in their own memory space. It is therefore desirable to provide a controller for controlling storage in the memory of the demultiplexed data and for controlling access to the demultiplexed data by the MPEG-2 decoders.

SUMMARY OF THE INVENTION

It is therefore an object of the present invention to provide a controller, in dependence of the programmable transport interface controller and the main system processor, for controlling storage of the demultiplexed data in memory.

According to the present invention there is provided a memory controller comprising:

input circuitry for receiving data to be stored in the memory;

storage means for storing the base and top addresses of a circular buffer in the memory to which the received data is to be stored, and for storing a write pointer for the buffer;

addressing circuitry for generating the address to which the received data is to be written in dependence on the stored base and top address and write pointer; and output circuitry for writing the data into the circular buffer at the generated address.

The invention also provides a method of controlling storage of data in a memory comprising:

receiving data to be stored in the memory;

storing base and top addresses of a circular buffer in memory to which the received data is to be transferred, and storing a write pointer for the buffer;

generating an address to which the received data is to be written in dependence on the stored base and top addresses and the stored write pointer; and writing the data into the circular buffer at the generated address.

BRIEF DESCRIPTION OF DRAWINGS

The invention will now be described with reference to the accompanying drawings, in which:

FIG. 3 illustrates in more detail the interconnection of the DMA controller of FIG. 2;

DESCRIPTION OF PREFERRED EMBODIMENT

In the following description the present invention is described with reference to an exemplary embodiment in which an MPEG-2 transport stream is demultiplexed in a programmable transport interface of a receiver in a digital set-top-box. It will be apparent, however, that the present invention is not limited to such an application and does in fact have broader applicability to other types of digital data and other types of application.

Figure 1:
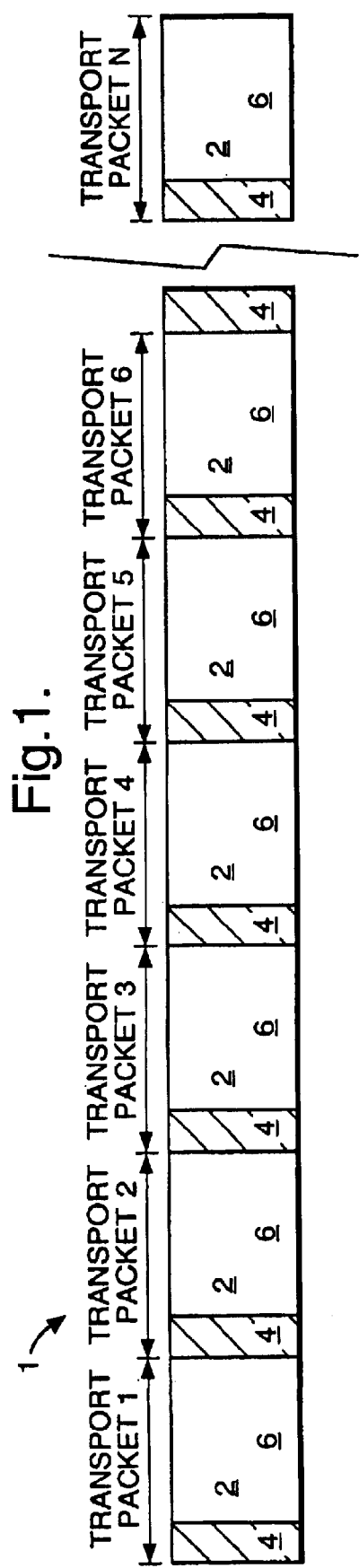
FIG. 1 illustrates a portion of a transport stream.

FIG. 1 illustrates a portion of a transport stream 1 which is composed of a series of N transport packets 2. Each transport packet 2 comprises a transport packet header 4 and a transport packet payload 6. The transport stream is a bit stream which carries in the transport packet payloads 6 information for recreating, for example, a number of different television programmes. The transport stream is formed by source encoding the television programmes. The transport stream is then typically channel encoded for transmission (by satellite or cable) and channel decoded on its reception to reproduce the transport stream. The transport stream is then source decoded to recreate a selected one of the different television programmes. Each particular television programme requires three types of information (audio information, video information and tables of programme information) for its recreation. Each transport packet 2 is preferably associated with a particular television programme, a particular source encoding time and a particular one of the information types. The individual transport packets are time division multiplexed to form the transport stream and allow the real-time recreation of any one of the different television programmes from the transport stream. To recreate a television programme the transport stream is sequentially demultiplexed to recover only the transport payloads 6 of audio information, video information and tables of programme information which are associated with the selected television programme. The recovered payloads are then decoded and used to recreate the television programme.

According to the MPEG-2 digital video broadcast (DVB) standard each of the transport packets 2 is 188 bytes long and the transport packet header 4 is 4 bytes long. The transport packet payload 6 contains either audio or video information or sections. The sections are parts of tables. The audio and video information and the sections in the payloads 6 are packetised and encoded in accordance with the MPEG-2 DVB compression standard.

Figure 2:
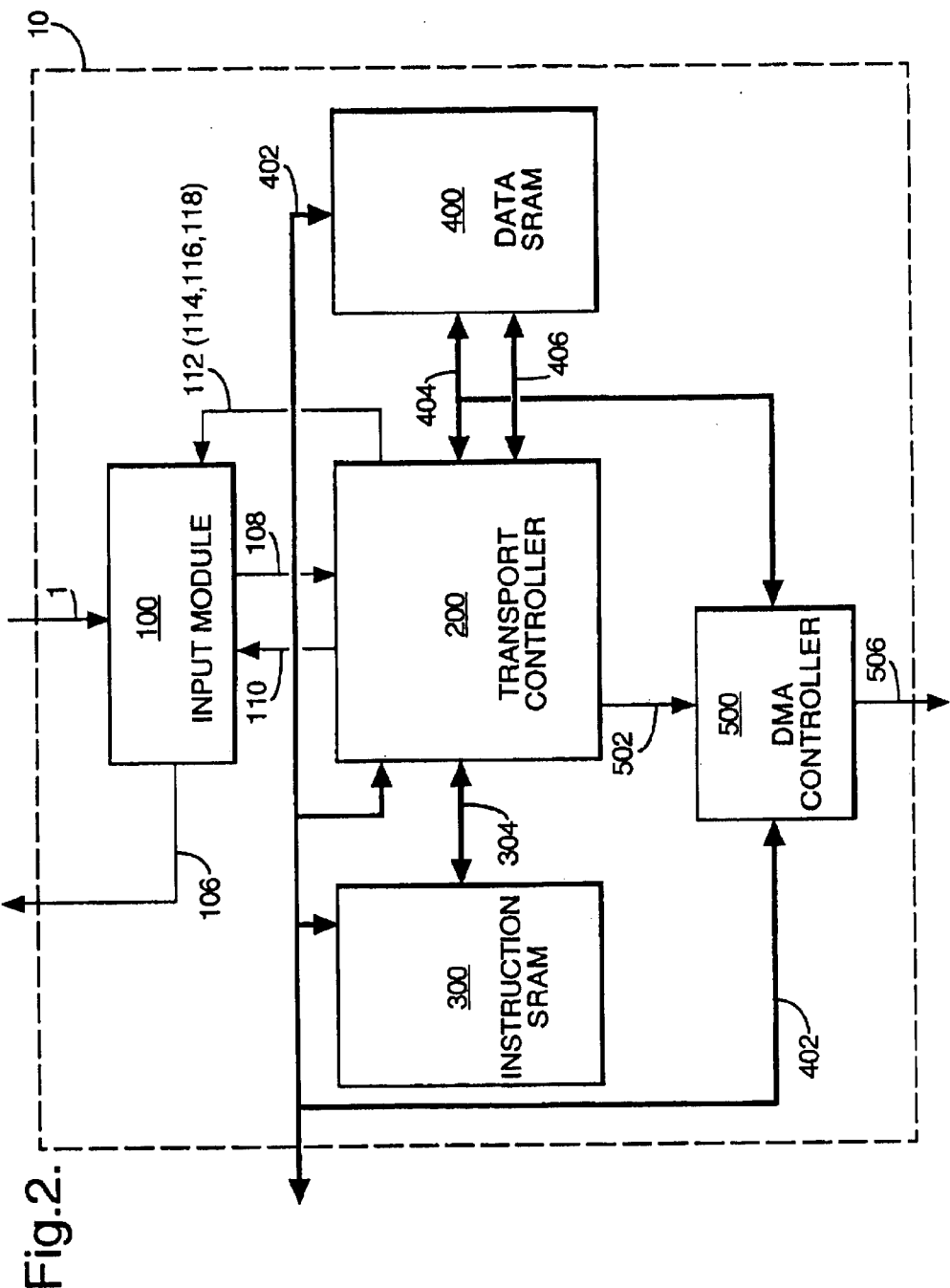
FIG. 2 illustrates in block schematic form a programmable transport interface.

A programmable transport interface 10, illustrated in FIG. 2, is used to process a transport stream 1 and produce a data output stream 506 suitable for reconstitution as a television programme after MPEG-2 decoding by MPEG-2 decoders (not shown). The programmable transport interface 10 is included in a receiver which receives the transport stream 1.

The transport packet header 4 contains a synchronisation byte which identifies the beginning of each transport packet 2. The transport packet header also contains a packet identification (PID) which identifies the information type and the television programme associated with the transport packet payload 6. The transport packet 2 also contains information identifying the source encoding time of the transport packet. The transport packet header 4, including the synchronisation byte and the PID, is not scrambled. The transport packet payload 6 may be scrambled.

The programmable transport interface (PTI) 10 performs various functions including:

i) using the synchronisation byte to identify the start of a transport packet 2;

ii) using the packet identification (PID) to identify, amongst other functions, the type of information contained in the packet (i.e. audio or video information or sections) and the television programme it represents;

iii) descrambling the transport packet payloads 6; and iv) demultiplexing the transport stream 1 to produce a data output stream 506.

The data output stream 506 comprises a stream of audio information associated with the selected television programme, a stream of video information associated with the selected television programme, or tables of programme information associated with the selected television programme. The PTI outputs these streams to the necessary MPEG-2 decoders to reproduce the selected television programme.

The programmable transport interface 10 comprises five primary functional blocks: an input module 100; a transport controller 200; an instruction SRAM (static RAM) 300; a data SRAM (static RAM) 400; and a multi-channel DMA (direct memory access) controller 500.

The input module 100 receives the transport stream 1, and outputs an alternative output stream 106. The input module 100 identifies the synchronisation byte of each transport packet which is used to synchronise the system clock and the transport stream. The input module 100 is controlled by the transport controller 200 via an input module control signal 112 which includes a descrambling control signal 114, an alternative stream control signal 116 and output stream control signals 118. The input module 100 provides bits to the transport controller 200 via an interconnect 108 and it receives bits back from the transport controller 200 via the interconnect 110. The input module, under the control of the transport controller 200 via the input module control signal 112, descrambles the payload 6 of selected transport packets 2 and supplies the selected descrambled payloads to the transport controller 200 via the interconnect 108. The descrambling of the payloads is controlled by the descrambling control signal 114 supplied by the transport controller 200 and the number and rate of bits supplied on the interconnect 108 is controlled by the output stream control signal 118. The input module 100 receives, along the interconnect 110, bits from the transport controller 200 which may be output as the alternative output stream 106 under the control of the alternative stream control signal 116.

The transport controller 200 operates on the bits received on interconnect 108 from the input module 100. The transport controller 200 receives from the input module 100 via interconnect 108 the transport packet header 4 of the transport packet 2 arriving at the transport stream input interface 102. The transport controller 200 uses the packet identifier (PID) in the transport packet header 4 to determine whether the transport packet 2 now entering the input module 100 is associated with a selected television programme for the programmable transport interface 10. If it is not, the received transport packet 2 is discarded. If it is, it controls the input module 100 to descramble (if necessary) the transport packet payload (as described above), and to supply the transport packet payload 6 via the interconnect 108 to the transport controller 200. The transport controller 200 may pass a payload 6 associated with audio or video information for the selected programme straight to the transport controller output 502. If the payload 6 relates to a section of a table the transport controller 200 may process the information before providing it at its output 502. Alternatively the transport controller 200 may process the received payloads 6 and repacketise them in accordance with a different transmission standard. The reformatted transport stream is then provided to the input module 100 via the interconnect 110 and it is output as the alternative output stream 106 under the control of the alternative stream control signal 116.

The transport controller 200 comprises a transport processor (not shown) which reads instruction sets from the instruction SRAM 300. The transport controller 200 is connected to the SRAM 300 by interconnect 304 and it reads its instructions via the interconnect 304. A system processor (not shown) may read and write to the instruction SRAM 300 via a system interface bus 402. However, the transport controller 200 has preferential access to the instruction SRAM 300 determined by an arbiter (not shown) which arbitrates between accesses by the transport controller 200 and the system processor. The system processor may also access the transport controller 200 via the system interface bus 402.

The data SRAM 400 can be accessed by the processor of the transport controller 200 via the interconnections 404 and 406. The processor of the transport controller uses the interconnection 404 to read from and write to the data SRAM 400. A search engine within the transport controller 200 reads from the data SRAM 400 along interconnection 406. The search engine searches the data SRAM 400 for the packet identifier (PID) in the incoming transport packet header 4. If the packet is not to be discarded, then the PID for that packet will have been stored in the data SRAM, and is located by the search engine of the transport controller. Associated with each PID in the data SRAM is a plurality of pointers, which point to other addresses in the data SRAM where other information associated with the incoming transport packet is stored. The search engine retrieves the pointers stored with a particular PID for use by the transport controller processor. The transport controller processor then uses the pointers to access all the information it needs to process the payload of the incoming transport packet. The pointers may, for example: point to descrambling keys for use by the input module 100; point to addresses for use by the DMA controller 500; identify whether the payload is video or audio information or sections, identify whether the payload is special data to be output on alternative output stream 106; or locate information for masking the search filter etc. A detailed description of the operation of the search engine of the transport controller 200 in reading the data SRAM is given in copending Application No.

Thus, this information enables the transport controller to generate the input module control signals 112 as appropriate, and control the processing, if any, of the bits received on interconnect 108.

The transport controller 200 produces a transport controller output 502 which is supplied to the multi-channel DMA controller 500. The multi-channel DMA controller 500 supplies the data output stream 506, indirectly, to the MPEG-2 decoders (not shown in FIG. 2).

The system processor writes to each of the instruction SRAM 300, the transport controller 200 and the data SRAM 400 via the system interface bus 402. The instruction SRAM 300 can only be written to by the system processor: the transport controller can only read from, and not write to, its own instruction SRAM 300 via the interface 304. The system processor can also read from the instruction SRAM. An arbiter is provided to arbitrate between accesses to the instructions SRAM 300 by both the system processor and the transport controller 200.

The system processor, via the system interface bus 402, and the transport controller 200 via interface bus 404, can both read and write to the data SRAM 400. The search engine of the transport controller 200 can only read from the data SRAM 400 via interface bus 406. An arbiter is provided to arbitrate accesses to the data SRAM 400 by each of the system processor, the transport controller 200, and the search engine within the transport controller 200. Access to the data SRAM 400 is arbitrated with the following order of priority: the search engine within the transport controller 200 has highest priority, the transport controller processor next priority, and the system processor lowest priority. The transport controller may be reset by the system processor by a reset signal on the interface bus 302.

The system processor, via system interconnect bus 402, and the transport controller 200 via the bus 404, can both read and write to registers within the DMA controller 500. An arbiter is provided to arbitrate between the system processor and transport controller access to the DMA controller.

The system processor via system interface 402 also accesses registers within the transport controller 200, to read and write thereto.

The system processor initially writes to the instruction SRAM 300, the data SRAM 400, and registers within the transport controller 200 and the DMA controller 500, to configure them.

The DMA controller 500 of the programmable transport interface 10 of FIG. 2 controls the input into memory of demultiplexed data on lines 502 from the transport controller 200. The output 506 of the DMA controller 500 outputs, as will be described in further detail hereinafter, data demultiplexed by the transport controller 200 into appropriate areas of the main processor memory.

Referring now to FIG. 3, there is shown in more detail the interconnection of the DMA controller 500 with the transport controller 200, a main processor 700, a main memory 702, a first MPEG decoder 704, a second MPEG decoder 706, a third MPEG decoder 708 and an arbiter 710. The arbiter 710 is not shown in FIG. 2 for clarity purposes, but in fact arbitrates between accesses to the DMA controller 500 via the system interconnect bus 402 and the transport controller interconnect bus 404. Thus the arbiter 710 receive the transport controller interconnect bus 404 from the transport controller 200 and the main processor interconnect bus 402 from the main processor 700. The arbiter 710 then provides access to the DMA controller 500 for the one of the transport controller 200 and the main processor 700 which is chosen to have control of the DMA controller 500. The arbiter 710 generates an arbiter request signal ARBREQ on line 712 to the DMA controller 500, receives an arbiter grant signal ARBGRANT on line 714 from the DMA controller 500, generates an arbiter address ARBADD on lines 716 to the DMA controller 500, generates arbiter input data ARBDATAIN on line 718 to the DMA controller, receives arbiter output data ARBDATAOUT on line 720 from the DMA controller, and generates an arbiter read/write signal ARBR/W on line 720 to the DMA controller 500. In the event of a simultaneous request by both the main processor 700 and the transport controller 200 to have access to the DMA controller 500, the arbiter 710 grants access to the transport controller 200.

The transport controller 200 outputs the data to be transferred to processor memory 702 to the DMA controller 500 via output lines 502. As shown in FIG. 3 the output lines 502 include a set of data lines DATA 724, a transport controller request signal TCREQ on line 726 output by the transport controller 200 to the DMA controller 500 and a transport controller grant signal TCGRANT on line 728 output from the DMA controller 500 to the transport controller 200.

The memory which the DMA controller 500 outputs data to for storage is the main system memory 702, and therefore the output of the DMA controller 500 shown in FIG. 2 is, in this preferred implementation of the invention, the system interconnect bus 402. Thus in FIG. 3 the DMA controller 500 is shown outputting data onto the main system interconnect bus 402 rather than to the output signals 506.

The main system interconnect bus 402 between the DMA controller 500 and main memory 702 includes a DMA read/write signal DMAR/W on line 730 from the DMA controller 500 to the main memory 702, DMA data output signals DMADATAOUT on lines 732 from the DMA controller 500 to the main memory 702, a DMA request signal DMAREQ on line 738 from the DMA controller 500 to the main memory 702, a DMA grant signal DMAGRANT on line 736 from the main memory 702 to the DMA controller 500, a DMA valid signal DMAVALID on line 734 from the main memory 702 to the DMA controller 500, DMA input data DMADATAIN on lines 740 from the main memory 702 to the DMA controller 500, and a DMA address signal DMAADD on lines 742 from the DMA controller 500 to the main memory 702.

As additionally shown in FIG. 3, the main system interconnect bus 402 connects to the main processor 700.

Each of the MPEG decoders 704 to 708 generate a respective compressed data request signal CDREQ1 to CDREQ3 on lines 744a to 744c respectively. The compressed data request signals CDREQ1–3 are input as lines 744 to the DMA controller 500. In addition each of the first to third MPEG decoders 704 to 708 output signals, on lines 746a to 746c respectively, to the main memory 702.

Figure 4A:
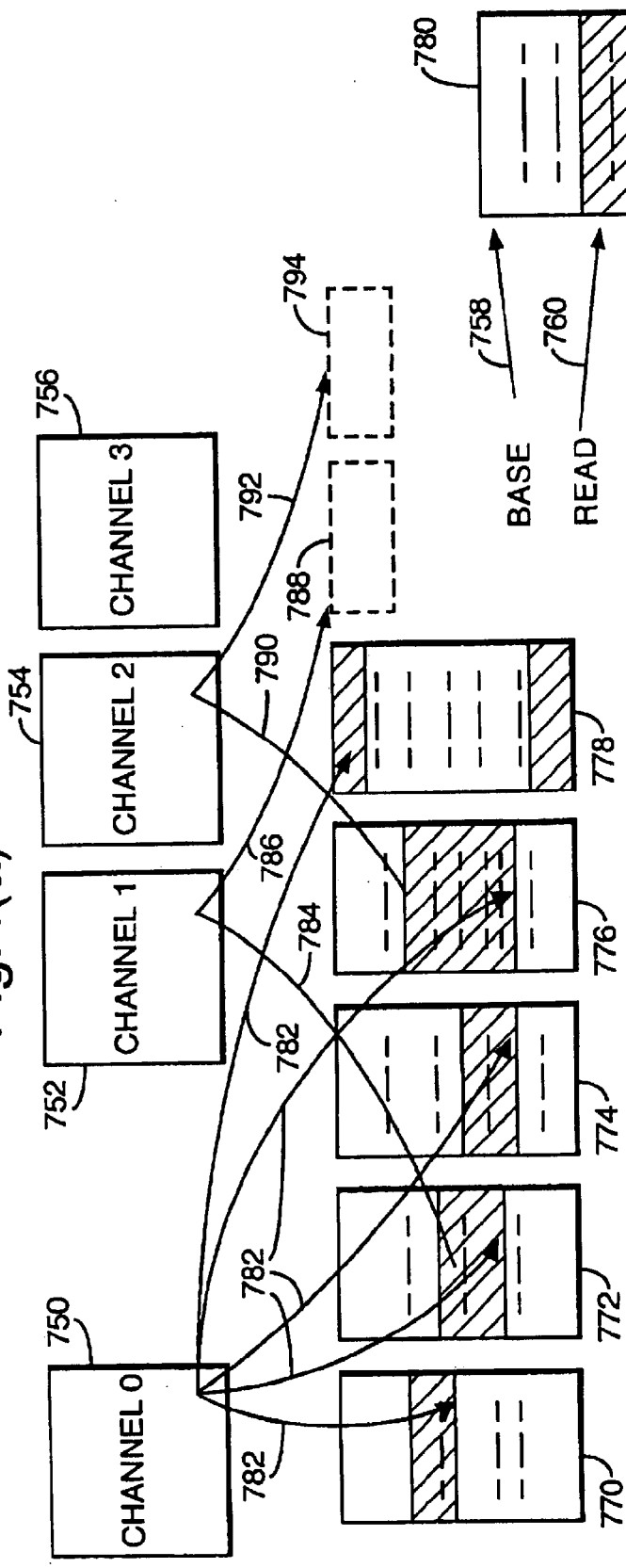
FIG. 4 illustrates schematically the arrangement of data storage in memory in accordance with the invention.
Figure 4B:
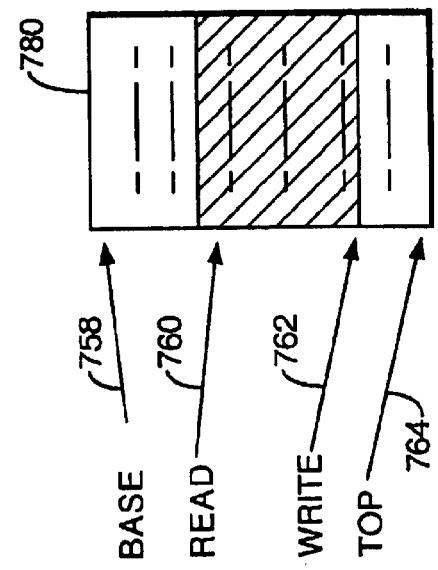

With reference to FIGS. 4a and 4b, a description of the =principle of operation of the DMA controller 500 in controlling the storage of data from the transport controller 200 into the main memory 702 will be described, together with the removal of data from the main memory 702 by the respective MPEG decoders 704 to 708.

The DMA controller 500, in the preferred embodiment of the invention, has four channels for controlling storage and retrieval of data in the main processor memory 702. These channels are: channel 0, channel 1, channel 2 and channel 3, generally designated in FIG. 4a for the purposes of illustration by blocks 750, 752, 754 and 756.

Channel 0 is the "normal" channel of the DMA controller which controls the storage of data from the programmable transport interface in the main processor memory 702. In accordance with the present invention, channel 0 stores data from the programmable transport interface in any one of a plurality of buffers allocated within the main system memory 702. Referring to FIG. 4a, five such buffers are illustrated generally as 770, 772, 774, 776 and 778. Each buffer is defined in a block of reserved memory space in the main processor memory 702.

FIG. 4b shows a further exemplary buffer 780 allocated for data storage of data from the programmable transport interface in the main system memory 702. As shown in FIG. 4b, the buffer 780 has a base address indicated by arrow 758, and a top address indicated by arrow 764. The base address and top address may initially be configured by the main system processor 700. The main system processor thus may configure any number of such buffers in memory for storage of data from the programmable transport interface. A write pointer 762 points to the location in the buffer 780 where channel 0 of the DMA controller is currently writing to, and a read pointer 760 points to the location in the buffer 780 where another device, such as any one of the MPEG decoders 704 to 708, is currently reading data from. Thus, each of the buffers 770, 772, 774, 776 and 778 in FIG. 4a can be defined by reference to a base address, a top address, a read pointer and a write pointer.

As shown in FIG. 4a, channel 0 of the DMA controller writes data into each of the various buffers as indicated by arrows 782. When each data packet is received by the programmable transport interface, the PID associated therewith and stored in the data SRAM 400 will have stored in the data SRAM and associated therewith the base address, top address, and read and write pointers of the buffer to which the data payload in that packet should be written to. Thus successive incoming transport packets will be written into the buffers of the main system memory in dependence on the values of such registers associated with the PID of the incoming packet.

An important aspect of the present invention is that each of the buffers 770, 772, 774, 776 and 778 is circular. That is, once the write pointer 762 of the buffer 780 of FIG. 4b reaches the top address of the register, the next block of data is written into the base address of the register 758. Similarly when the read pointer 760 reaches the top 764 of the buffer, the next location read is the base address of the buffer. Thus, there is no requirement for any processor monitoring of the memory space being written to, to reallocate memory space in order to deal with additional incoming data. The circular nature of the buffers means that the read and write points associated with the buffers can "wrap around" within the buffer. If adding of new data to any buffer causes the write pointer to "overtake" the read pointer, then there is an overflow error.

Each of channel 1, channel 2 and channel 3 is associated with the respective one of the MPEG decoders 704, 706 and 708 shown in FIG. 3. Each of channels 1, 2 and 3 of the DMA controller retrieve data from one of the buffers 770 to 778 and store it in a location in the main memory 702 reserved for use by the respective MPEG decoder. Thus, as shown in FIG. 4a, channel retrieves data stored in the circular buffer 772 as indicated by line 784, and stores it in a location 788 of the main memory 702. Similarly channel 2 retrieves data from the buffer 776 as indicated by line 790, and stores it in a reserved block 794 of the main memory 702 as indicated by arrow 792.

As will be described in detail further hereinafter, each of channels 1, 2 and 3 of the DMA controller store the base and top address of the buffers from which they retrieve data, together with the current read and write pointers of such buffer. Whenever the read and write pointers of such buffer differs, indicating that data has been stored therein, they access such data and retrieve it for storage in their respective reserved memory space. Thus, whenever the read and write pointers of the circular buffer 772 are not equal, channel 1 will attempt to retrieve data therefrom and store it in the reserved memory space 788.

Figure 5:
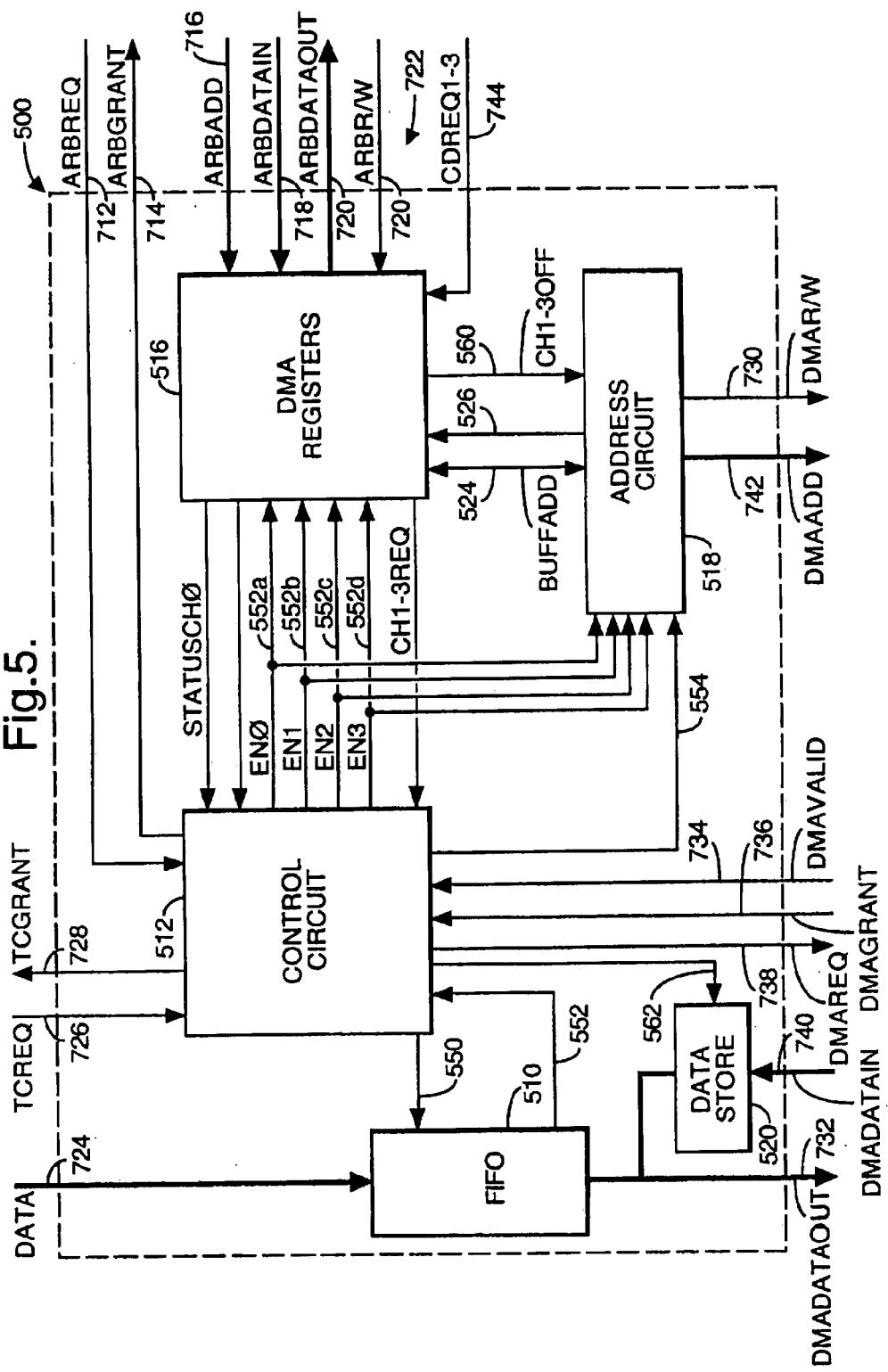
FIGS. 5 and 6 illustrate an implementation of a DMA controller in accordance with the present invention.

A more detailed description of the operation of the DMA controller according to the present invention will now be given with reference to FIGS. 5 and 6. FIG. 5 illustrates a block diagram of the main circuit elements of the DMA controller 500. The DMA controller 500 includes a control circuit 512, a FIFO 510, an address circuit 518, a data store 520, and DMA registers 516. The DMA registers 516 include a channel enable register 522, a compressed data address configuration register 524, an address decode block 526, a channel 0 status register 528, channel 0 to 3 base address registers 530a to 530d, channel 0 to 3 top address registers 532a to 532d, channel 0 to 3 read pointer registers 534a to 534d, channel 0 to 3 write pointer registers 536a to 536d, channel 1 to channel 3 burst registers 538a to 538c and channel 1 to channel 3 holdoff registers 540a to 540c.

The DMA registers 516 contain various configuration information for the DMA controller. The base address registers 530, top address registers 532, read pointer registers 534, and write pointer registers 536 contain the base and top addresses of the circular buffers for the appropriate channel, together with the read and write pointers for the appropriate channel as described hereinabove with reference to FIG. 4. The respective registers associated with channels 1, 2 and 3 may be configured prior to operation by the main processor. The base and top address registers and the read pointer and write pointer address registers for channel 0 will be loaded by the transport controller 200 on receipt of a data packet for storage in the memory as will be described in detail hereinafter.

The channel 0 status register 528 stores the current status of channel 0 as will be described hereinafter, the burst registers 538 store for the respective channels 1 to 3 whether the respective channel is written to either a byte or a word at a time, the holdoff registers 540 for channels 1 to 3 indicate the minimum number of cycles between checking to see whether the respective MPEG decoder wishes to access data from its circular buffer, and the compressed data address configuration register 524 indicates the configuration of the addresses in the main processor memory which are reserved for the MPEG decoders. Effectively the compressed data address configuration register 524 stores the offset from a base address where each of the reserved memory spaces for the MPEG decoders associated with channels 1, 2 and 3 begins. The operation of the DMA controller according to the present invention will now be described with reference to examples in conjunction with FIGS. 5 and 6.

When an incoming transport packet is demultiplexed by the transport controller 200 and it is determined that the data payload of such transport packet is to be retained, the PID of the incoming transport packet is used to access the data SRAM 400 and retrieve therefrom information associated with that PID. Such information includes the base and top address of the circular buffer to which the data is to be written, together with the current read and write pointers for such buffer. The transport controller 200 then asserts the transport controller request signal TCREQ on line 726 which is received by the control circuit 512 of the DMA controller 500. If the DMA controller is not performing any other operation, then it will grant the transport controller's request by asserting the transport controller grant signal TCGRANT on line 728. In response to the signal TCGRANT the transport controller will access the DMA registers 516 of the DMA controller 500 via the transport controller bus 404 through the arbiter 710 and the arbiter bus 722 to configure the appropriate ones of the DMA registers 516. In this case, the transport controller 200 will load into the channel 0 base register, channel 0 top register, channel 0 read pointer register, and channel 0 write pointer register the appropriate values for the circular buffer in the main memory 702 to which the data payload of the transport packet is to be written. If there has been no data yet received, then the read and write pointers are both equal. If data has already been received but not completely removed by channels 1 to 3, the write pointer will lead the read pointer.

After the loading of the DMA registers 516, the transport controller 200 outputs on the data bus 724 the data to be stored in the appropriate circular buffer, which is input to the FIFO 510 of the DMA controller 500. In the preferred embodiment, the FIFO 510 is a byte wide FIFO and the transport controller 200 outputs data bytes onto the data bus 724. In the preferred embodiment the FIFO 510 can store 64 bytes of data. The size of the FIFO 510 is chosen such that it will not overflow under normal operating conditions. Thus the data payload of an incoming packet may be stored in the FIFO 510 while the DMA is busy, or waiting for a memory access. If the FIFO 510 fills up, then the DMA controller will not grant any more requests from the transport controller 200 until space is again available in the FIFO.

The data bytes on the bus 724 are loaded into the FIFO 510 under control of the control circuit 512 via control signal line 550.

When setting the TCGRANT signal on line 728 the control circuit 512 additionally sets the signal EN0 on line 552a to the DMA registers 516 which sets bit 522a in the channel enable register 522 indicating that channel 0 of the DMA controller is enabled. In response thereto, the contents of registers 530a, 532a, 534a and 536a are output onto the base, top, read and write signal lines 524a, 524b, 524c and 524d respectively. The signals are output as the signals BUFFADD on signal lines 524 to the address circuit 518. The address circuit 518 also receives the signal EN0 on line 552a from the control circuit 512. In response to this signal the address circuit 518 inputs from the DMA registers 516 the signals BUFFADD on line 524.

Once data has been loaded into the FIFO 510, the control circuit 512 asserts the DMA request signal DMAREQ on line 738 to the main memory 702. If such request is allowed, the control circuit 512 receives a signal asserted on the signal line DMAGRANT 736. In response to the grant signal on line 736, the control circuit 512 controls the FIFO 510 via line 552 to output data onto the DMADATAOUT bus 732. Simultaneously thereto, the appropriate address to be written to in the circular buffer is output on the DMA address bus DMAADD 742 by the address circuit, and the address circuit asserts the DMA write signal DMAR/W. For successive bytes output from the FIFO 510 the address circuit 518 increments the write pointer output on DMAADD. When the data payload of the incoming transport packet has been emptied from the FIFO 510, the control circuit 512 sets a control signal on line 554 to the address circuit. Responsive to the control circuit 554 the address circuit 518 sets a control signal on line 526 to the DMA register 516 and updates the value of the channel 0 write pointer 368 to the new value following the data written thereto.

If any one of channels 1, 2 and 3 accesses data from the same circular buffer to which channel 0 has just written, then the read pointer for that channel must also be updated. Such update is carried out directly by the main processor 700. The above-described operation is then repeated for successive memory requests from the transport controller 200 responsive to incoming transport packets.

The signals CDREQ1–3 on lines 744 are input to the channel 1 to channel 3 holdoff registers 540. In response to receiving its respective request signal CDREQ1–3, each channel 1 holdoff register outputs a respective channel 1 to 3 request signal CH1–3REQ on line 558 to the control circuit 512. The holdoff registers 540 determine the delay between the respective one of the signals CDREQ1–3 being set and the signals CH1–3REQ being set.

The control circuit 512 operates a "round robin" polling scheme. Thus the control circuit on completing any memory access of the DMA controller 500 looks to see if the transport controller 200 has set its request signal TCREQ, and then successively looks at each of the signals CH1–3REQ. In response to one of the signals CH1–3REQ being set, the control circuit 512 of the DMA controller performs a channel 1, 2 or 3 memory access as described hereinafter. For the purposes of illustration, it will be assumed that the signal CDREQ1 has been set, and as a consequence the signal CH1REQ has been set on line 558 to the control circuit 512. However, a memory access by either of channels 2 or 3 is identical to that of channel 1.

In response to the signal CH1REQ being set, and after the control circuit 512 terminates operation of a channel 0 memory request of the DMA controller 500, the control circuit 512 sets the signal EN1 on line 552b indicating that channel 1 should be enabled. The bit 552b is set, and the contents of the channel 1 registers 530b, 532b, 534b and 536c output as signals BASE, TOP, READ and WRITE respectively. The signal EN1 on line 552b is also input to the address circuit 518. In response to the signal EN1 on line 552b the address circuit 518 inputs the contents of the channel 1 base register 530b, the channel 2 top register 532b, the channel 1 read pointer register 534b and the channel 1 write pointer register 536b on lines BUFFADD. Responsive to the signal EN1 the address circuit 518 also receives the contents of the compressed data address configuration register 524 CH1–3OFF on lines 560. As before, the control circuit 512 requests memory access to the main memory 702, and receives a grant signal DMAGRANT on line 736. In response thereto, the control circuit 512 sets one of the control signals 554 to the address circuit 518 to indicate that it may commence memory access. The address circuit 518 sets the DMA read/write signal DMAR/W on line 730 to indicate a read, and outputs on the DMA address bus DMAADD the address in main memory 702 of the read pointer of the buffer from which data is to be read. The address circuit 518 increments the read pointer through successive memory addresses until its value equals the write pointer. If the read pointer value reads that of the top address, then the read pointer wraps around to the base address.

On each memory read access from the memory 702, the main memory 702 sets the signal DMAVALID on line 734 which is input to the control circuit 512. In response to the signal DMAVALID the control circuit 512 sets the control signal 562 to input into the data store 520 the data output from the main memory on the bus DMADATAIN 740. The address circuit 518 may then increment the read pointer and access successive bytes from the circular buffer. After only accessing one byte, or accessing a number of bytes, the address circuit 518 sets the DMAR/W signal to indicate a write operation and outputs on the DMAADD bus 742 the address of the reserved area of main memory associated with the first MPEG decoder 704. The control circuit 512 then sets the control signal 564 to output from data store 520 the data retrieved from the circular buffer on to the DMADATAOUT bus 732. The data is thus written into the appropriate area of main memory 702.

When the channel 1 memory access is completed, the address circuit 518 writes the updated value of the read pointer via BUFFADD lines into the channel 1 read pointer register 534b and write pointer register 536b under the control of signal 526. The main system processor 700 updates the contents of the read pointer register, for the appropriate circular buffer, in the data SRAM 400.

This operation is repeated successively as required. The operation of channel 2 and channel 3 in the DMA controller is the same as that of channel 1.

Figure 6:
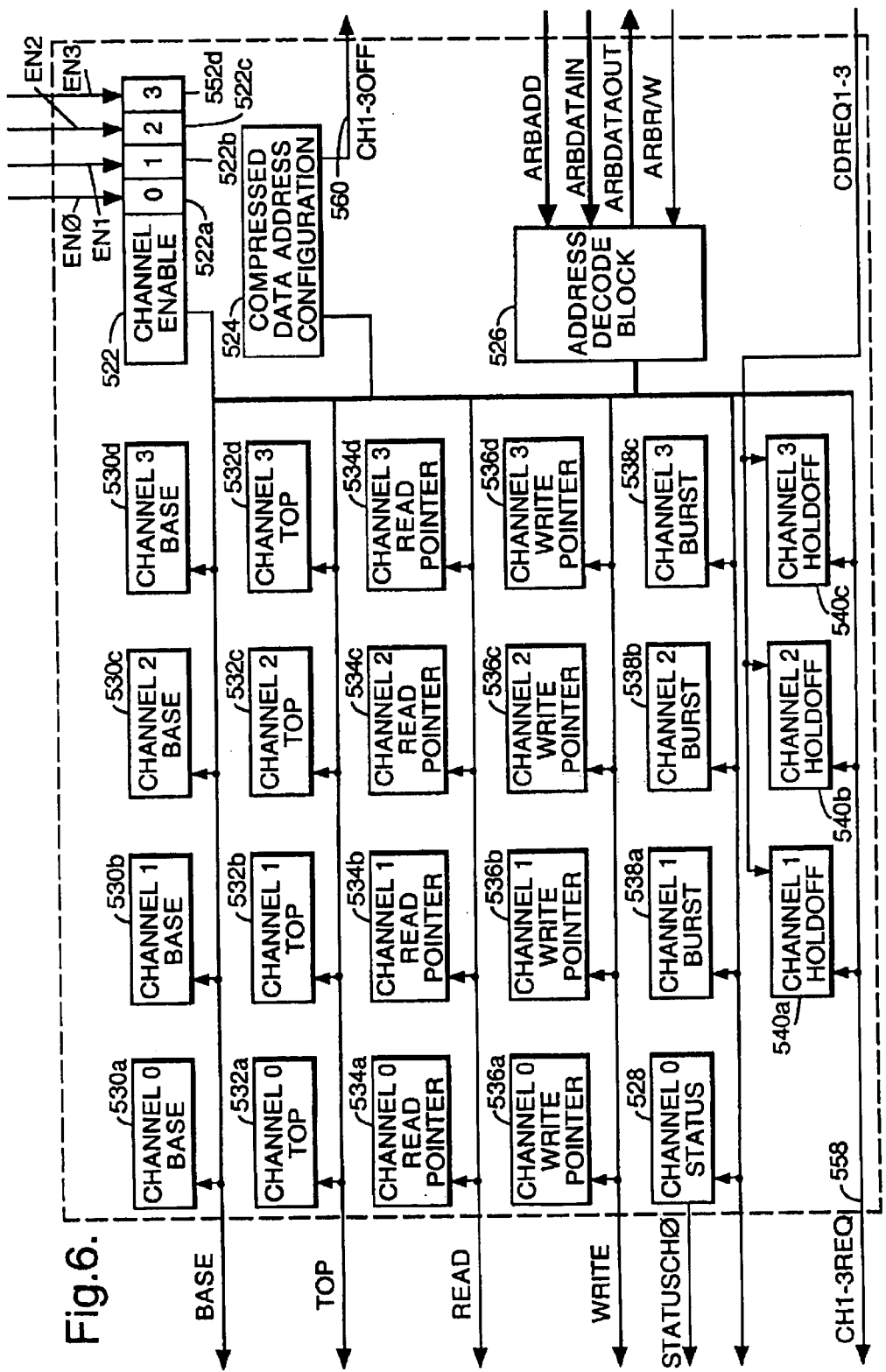
Figure 7:
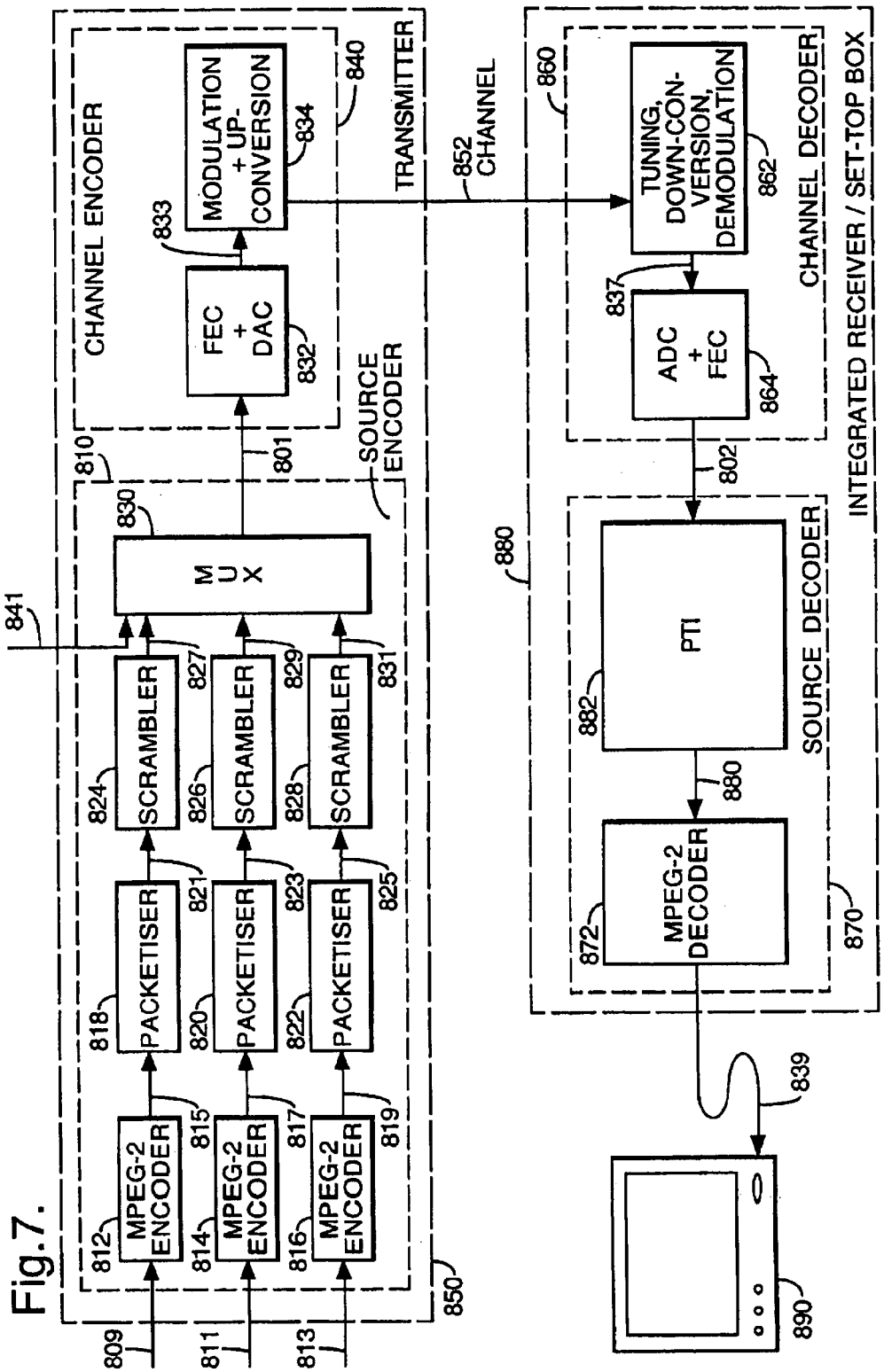
FIG. 7 illustrates a digital broadcast television system including a programmable transport interface in a set-top-box utilising the present invention.

FIG. 6 illustrates an application of a programmable transport interface, according to the present invention, in a digital television system.

FIG. 6 illustrates how digital television signals 809, 811, and 813 can be transmitted via a cable, satellite or terrestrial television channel 852 and be viewed on a television 890. The first, second and third television signals 809, 811 and 813 each represent the audio and video signals necessary to recreate a television program on input to a television. The digital television signals 809, 811 and 813 are source encoded and channel encoded by a transmitter 850 to produce a modulated analogue signal for transmission on the channel 852. An integrated receiver decoder (also known as a set-top-box) 880 receives the modulated analogue signal from the channel 852 and produces a video signal 839 which operates the television 890.

The operation of the transmitter 850 will now be explained. The transmitter includes a source encoder 810 and a channel encoder 840. The source encoder includes— first, second and third MPEG2 encoders 812, 814 and 816; first second and third packetisers 818, 820 and 822; first, second and third scramblers 824, 826 and 828 and a multiplexer 830. The first, second and third MPEG-2 encoders respectively receive the first 809, second 811 and third 813 television signals and encode the signals to produce first, second and third elementary bit streams 815, 817 and 819. The first 818, second 820 and third 822 packetisers respectively receive the first 815, second 817 and third 819 elementary bit streams and packetise the elementary bit streams to produce first, second and third packetised elementary bit streams (PES) 821, 823 and 825. The packetising of an elementary bit stream includes creating a series of packets which contain a packet header and a data portion, but which do not have any fixed length. The first 824, second 826 and third 828 scramblers receive respectively the first 821, second 823 and third 825 packetised elementary bit streams (PES) and produce first, second, and third scrambled PES 827, 829 and 831. Each of the scramblers scrambles only the data portion of each packetised elementary bit stream it receives and does not scramble the packet header.

The multiplexer 830 receives as inputs packetised sections of tables on line 841, and the first, second and third scrambled PES 827, 829 and 831, and produces a transport stream from one of its inputs on line 801. The packetised sections of tables 841 contain information which allows the set-top-box 880 to effect source decoding and produce the video signals 839. The information is stored in a tabular format where each table contains a number of sections and each section is transmitted individually.

The multiplexer 830 produces a transport stream 801 such as that illustrated in FIG. 1 as discussed in detail hereinabove. The transport stream includes a number of transport packets 2 wherein each transport packet contains a transport packet header 4 and a transport packet payload 6. The transport packets have a fixed length which is dependent upon the estimated error in the channel 852, and this fixed length will be reduced if the channel is noisy. In the MPEG-2 digital video broadcast (DVB) standard the transport packet is 188 bytes in length. The transport packets are shorter in length than the packets in the packetised elementary stream (PES). Consequently, a packet from the first scrambled PES 827 will be spread over a number of transport packets and these transport packets will be multiplexed with transport packets derived from the packetised sections of tables 841 and the second and third scrambled PES 829, 831. The transport stream is then supplied on line 801 to the channel encoder 840 to produce the modulated analogue signal for transmission on the channel 852.

The channel encoder 840 includes circuitry 832 for forward error correcting (FEC) the transport stream on line 801 and a digital-to-analogue converter (DAC) for converting the signal from digital to analogue to produce an analogue signal 833. The analogue signal 833 is modulated and up-converted to a transmission frequency by the circuit 834 to produce the modulated analogue signal which is then transmitted into the channel 852.

The operation of the set-top-box 880 will now be explained. The set-top-box 880 includes a channel decoder 860 and a source decoder 870. The channel decoder 860 receives the modulated analogue signal on the channel 852 and produces the transport stream 802 which it supplies to the source decoder 870.

The channel decoder 860 includes circuitry 862 for tuning to the modulated analogue signal on the channel 852, and for down-converting and demodulating the modulated analogue signal on the channel 852 to produce an analogue signal 837. The analogue signal 837 is converted from analogue to digital in an analogue to digital converter (ADC) and forward error corrected (FEC) by the circuitry 864 to reproduce the transport stream as signal 802.

The source decoder 870 receives the transport stream 801 and produces the video signal 839. The source decoder 870 includes a programmable transport interface (PTI) 882 and MPEG-2 decoder 872. The PTI 960 demultiplexes the transport stream 802, selects the transport packets 2 carrying information relating to a particular television program, and descrambles these selected transport packets to produce a data output stream 880, which is, in fact, the packetised elementary bit stream associated with the selected television program. The MPEG-2 decoder 872 receives the data output stream 880 and produces the video signal 839 which is supplied to the television 890. The television 890 displays the selected television program.

What is claimed is:

1. A memory controller having a plurality of channels, the memory controller comprising:

input circuitry for receiving data to be stored in the memory;

storage means for storing the base and top addresses of a plurality of circular buffers in the memory to which the received data is to be stored, and for storing a write pointer for each buffer;

addressing circuitry for generating the address of one of the plurality of circular buffers to which the received data is to be written in dependence on a stored base and top address and write pointer; and output circuitry for writing the data into one of the plurality of circular buffers at the generated address, wherein at least one of the channels of the memory controller is arranged to control the storage of data in one of the plurality of circular buffers, and at least one of the channels is arranged to retrieve data from only a respective buffer.

2. The memory controller of claim 1, in which the storage means further stores a read pointer for each buffer.

3. The memory controller of claim 1, further comprising a control circuit responsive to said read and write pointers not being equal to control the output circuitry to write data from one circular buffer to a peripheral device that is associated with one of the channels.

4. The memory of claim 3, in which the storage means stores a plurality of top and base addresses, and read and write pointers, of a plurality of circular buffers associated with a plurality of peripheral devices.

5. A controller as claimed in claim 1 wherein each of said channels is able only to write to or read from one of said plurality of buffers.

6. A receiver for demultiplexing a digital data stream comprising:

input means for receiving the digital data stream;

a control means for demultiplexing the received digital data stream and generating demultiplexed data;

a memory having a plurality of circular buffers; and a memory controller for controlling storage in the memory of the demultiplexed data, the memory controller being arranged to have a plurality of channels, the memory controller comprising input circuitry for receiving data to be stored in the memory;

storage means for storing the base and top addresses of the plurality of circular buffers in the memory to which the received data is to be stored, and for storing a write pointer for each of the buffers;

addressing circuitry for generating the address of one of the buffers to which the received data is to be written in dependence on the stored base and top address and write pointer; and output circuitry for writing the data into one of the circular buffers at the generated address, wherein at least one of the channels is arranged to control the storage of data in any of the plurality of circular buffers and at least one of the channels is arranged to only receive data from a respective one of the buffers.

7. The receiver of claim 6, in which the digital data stream comprises MPEG-2 encoded data.

8. The receiver of claim 7, in which the storage means further stores the base and top addresses of a circular buffer defined in the memory and associated with a peripheral device together with read and write pointers for said buffer, the memory controller further comprising a control circuit responsive to said read and write pointers not being equal to control the output circuitry to write data from said circular buffer to the peripheral device in which the peripheral device is an MPEG-2 decoder and is associated with one of the channels.

9. A receiver as claimed in claim 6 wherein said data stored in said predetermined one of said buffers is arranged to be stored in a predetermined memory location.

10. A receiver as claimed in claim 6 wherein said at least one channel, arranged to store data only in a predetermined one of said buffers, is associated with a respective MPEG decoder.

11. A receiver as claimed in claim 6 wherein said each of said channels is able only to write to or read from at least one of said plurality of buffers.

12. A method of controlling storage of data in a memory having a plurality of channels, the method comprising:
receiving data to be stored in the memory;
storing base and top addresses of a plurality of circular buffers in memory to which the received data is to be transferred, and storing a write pointer for each buffer;
generating an address of a buffer to which the received data is to be written in dependence on the stored base and top addresses and the stored write pointer; and
writing the data into the circular buffer at the generated address, wherein at least one of the channels is arranged to control the storage of data in any of the plurality of circular buffers, and at least one of the channels is arranged to only retrieve data from a respective one of the buffers.

13. A memory controller having a plurality of channels comprising:
input circuitry for receiving data to be stored in the memory;
storage means for storing the base and top addresses of a plurality of circular buffers in the memory to which the received data is to be stored, and for storing a write pointer for each buffer;
addressing circuitry for generating the address of a buffer to which the received data is to be written in dependence on a the stored base and top address and write pointer; and
output circuitry for writing the data into one of said circular buffers at the generated address, wherein each of said channels is able only to write to or read from at least one of said plurality of buffers.

14. A receiver for demultiplexing a digital data stream comprising:
input means for receiving the digital data stream;
a control means for demultiplexing the received digital data stream and generating demultiplexed data;
a memory compromising a plurality of circular buffers; and
a memory controller for controlling storage in the memory of the demultiplexed data, said memory controller being arranged to have a plurality of channels, said memory controller comprising:
input circuitry for receiving data to be stored in the memory;
storage means for storing the base and top addresses of the plurality of circular buffers in the memory to which the received data is to be stored, and for storing a write pointer for each buffer;
addressing circuitry for generating the address of one of said buffers to which the received data is to be written in dependence on the stored base and top address and write pointer; and
output circuitry for writing the data into one of said circular buffers at the generated address, wherein each of said channels is able only to write to or read from one of said plurality of buffers.

15. A method of controlling storage of data in a memory comprising having a plurality of channels:
receiving data to be stored in the memory;
storing base and top addresses of a plurality of circular buffers in memory to which the received data is to be transferred, and storing a write pointer for each buffer;
generating an address of a buffer to which the received data is to be written in dependence on the stored base and top addresses and the stored write pointer; and
writing the data into the circular buffer at the generated address, wherein each of said channels is able only to write to or read from at least one of said plurality of buffers.

* * * * *

UNITED STATES PATENT AND TRADEMARK OFFICE
CERTIFICATE OF CORRECTION

PATENT NO. : 6,859,850 B2  Page 1 of 1
DATED : February 22, 2005
INVENTOR(S) : Andrew MacCormack It is certified that error appears in the above-identified patent and that said Letters Patent is hereby corrected as shown below:

Title page,
Item [56], References Cited, U.S. PATENT DOCUMENTS, insert the following:

| | | | |
|---|---|---|---|
| -- 5,765,187 | 06/1989 | Shimizu et al. | 711/110 |
| 5,886,998 | 03/1999 | Voith et al. | 714/702 |
| 5,832,307 | 11/1998 | Crary | 710/52 |
| 5,850,572 | 12/1998 | Dierke | 710/53 |
| 5,568,443 | 10/1996 | Dixon et al. | 365/230.05 |
| 5,797,033 | 08/1998 | Ecclesine | 710/22 |
| 5,867,176 | 02/1999 | Yamagishi | 345/473 |
| 6,104,752 | 08/2000 | Yamagishi | 375/240 |
| 6,032,180 | 02/2000 | Nishikawa | 709/217 |

FOREIGN PATENT DOCUMENTS
933926     08/1999     EPO --.

Signed and Sealed this

Eleventh Day of October, 2005

JON W. DUDAS
*Director of the United States Patent and Trademark Office*